United States Patent [19]

McNinch, Jr.

[11] 4,171,495
[45] Oct. 16, 1979

[54] WHEEL SPEED SENSOR

[75] Inventor: Joseph H. McNinch, Jr., Livonia, Mich.

[73] Assignee: Eaton Corporation, Cleveland, Ohio

[21] Appl. No.: 888,010

[22] Filed: Mar. 20, 1978

[51] Int. Cl.$^2$ ............................................ H02K 21/38
[52] U.S. Cl. .................................. 310/155; 310/168; 310/266
[58] Field of Search ............... 310/155, 168, 266, 111; 188/181; 324/178, 179

[56] References Cited

U.S. PATENT DOCUMENTS

| 3,549,924 | 12/1970 | Klein | 310/168 |
| 3,564,313 | 2/1971 | Goor | 310/168 |
| 3,832,908 | 4/1974 | Abbott | 310/266 X |
| 3,980,913 | 9/1976 | Peterson | 310/155 |
| 3,984,713 | 10/1976 | Presley | 310/155 |

Primary Examiner—Donovan F. Duggan
Attorney, Agent, or Firm—Blanchard, Flynn, Thiel, Boutell & Tanis

[57] ABSTRACT

A wheel speed sensor including an annular rotor fixed to a wheel for rotation therewith and having circumferentially distributed surface interruptions. A sensing device mounted near the rotor is fixed against rotation and includes a sensing portion opposable across an air gap to the surface interruptions of the rotor to produce a signal representing rotation of the surface interruptions past the sensing portion. The rotor and sensing portion are of complementary generally V-shaped cross section and are separated by a V-shaped air gap such that the output signal is substantially insensitive to relative motion between the rotor and sensing device in an axial plane of the rotor.

16 Claims, 5 Drawing Figures

WHEEL SPEED SENSOR

FIELD OF THE INVENTION

This invention relates to an improved wheel speed sensor for sensing the angular velocity of a rotating body, such as a vehicle wheel.

BACKGROUND OF THE INVENTION

While the present invention is applicable to a variety of rotation sensing uses and environments, one specific application of the present invention is as a wheel speed sensor system in automotive and truck vehicles. It provides an output signal suitable for driving an antilock system on such a vehicle.

Examples of prior wheel speed sensing systems may be seen in U.S. Pat. Nos. 3,854,556, 3,938,112, 3,961,215 and 4,029,180, assigned to the Assignee of the present invention. Such systems typically mount a rotor on the wheel of which the speed is to be sensed, and a speed sensing device is fixed with respect to the axle housing. The sensing device is typically of electromagnetic type, whereas the rotor is of ferromagnetic material and is provided with surface interruptions such as apertures, teeth or ripples.

The aforementioned systems have provided the rotor and sensing device with interacting radial portions axially opposed across an air gap. Variable reluctance-type sensing is achieved by providing a magnetic flux source, in the form of a magnet, in the sensing device to establish a flux path through pole pieces extending from the magnet to the radial surface of the sensing device, across the air gap, and into the slotted radial portion of the rotor. Rotation of the rotor moves the slots past the pole pieces to periodically change the magnetic flux in the path, which change is sensed by a coil wound around the magnet to provide a corresponding electrical output signal of frequency related to the rotation rate of the rotor. Since such devices are dependent solely on flux change for generation of an output signal, it is important that the flux change resulting from rotation of the rotor be significantly larger than any flux change resulting from radial or axial movement of the rotor relative to the sensing device, since these latter flux changes cause signal aberrations normally characterized as "noise". Thus, to obtain an accurate indication of the angular velocity of the rotating body, it is necessary that the sensing system have a high signal-to-noise ratio. This is particularly important when the wheel speed sensor provides the wheel speed signal for a vehicle antilock system, so that a skid condition can be detected and corrected in a proper manner.

Various of the aforementioned patents propose structures for obtaining an improved signal-to-noise ratio. A difficulty in such prior structures in presented by the requirement that the air gap be minimized in order to maximize the electrical output signal from the sensing device. However, as the air gap is reduced in the interest of greater system sensitivity, the more noticeable, in comparison, become even relatively moderate axial and/or radial movement of the rotor as it rotates relative to the sensing device, as due to cocking of the rotor with respect to its rotational axis, or flexing thereof during operation.

Accordingly, the objects and purposes of this invention include provision of:

(1) A rotation sensing system particularly for sensing the speed of a vehicle wheel, and intended to provide an increased signal-to-noise ratio.

(2) A system, as aforesaid, providing a rotor and opposed sensing device configured to reduce sensitivity to radial and axial motion of the rotor relative to the sensing device.

(3) A system, as aforesaid, in which the interacting faces of the rotor and sensing device, opposed across the air gap, are relatively large for permitting a relatively large air gap thickness without reducing system sensitivity, and for providing a more favorable ratio as between air gap thickness and expected radial and/or axial vibration or runout of the rotor.

(4) A system, as aforesaid, wherein the effect of rotor runout toward and away from the sensing device is substantially reduced by a tapered interfitting configuration of the rotor and sensing device, and wherein relative axial displacement of said rotor and sensing device results, in proportion of such taper, in a much smaller change in the thickness of the air gap.

(5) A system, as aforesaid, in which a two-legged air gap as provided between the tapered sensing device and rotor, cancels the effect of rotor runout in a direction transverse to such air gap, due to a reduction in the thickness of one air gap leg which is compensated for by a corresponding increase in the thickness of the other air gap leg, whereby the effective output signal is not disturbed.

(6) A system, as aforesaid, in which a rotor of relatively simple configuration is readily formable in relatively thin sheet metal while obtaining sufficient rigidity and resistance to deflection during rotation, by reason of its cross sectional configuration.

(7) A system, as aforesaid, which permits an improved signal-to-noise ratio despite use of only a single coil and substantially a single flux path.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a wheel speed sensor generating signals to indicate rotation of a body. The sensor includes an annular rotor fixed to the body for rotation therewith and having circumferentially distributed surface interruptions. A sensing device mounted near the rotor is fixed against rotation with it and includes a sensing portion opposable across an air gap to the surface interruptions of the rotor to produce a signal representing rotation of the surface interruptions past the sensing portion. The rotor and sensing portion are of complimentary generally V-shaped cross section as seen in an axial plane (i.e. a plane containing the axis) of the rotor and are separated by an air gap of correspondingly V-shaped cross section such that the output signal is substantially insensitive to relative motion between the rotor and sensing device in the axial plane.

DETAILED DESCRIPTION

Figure 1:
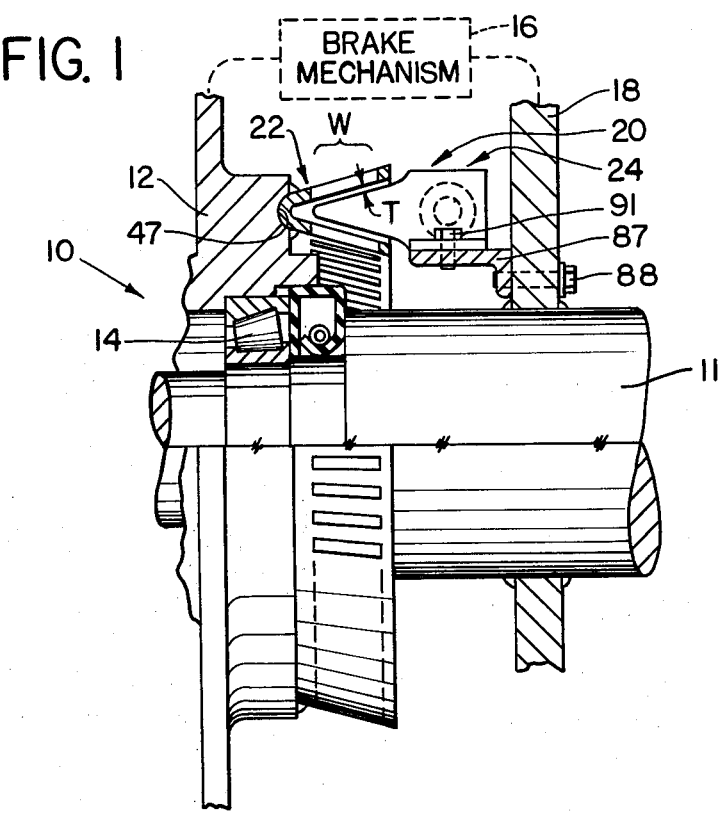
FIG. 1 is a fragmentary, partly broken side view of the rotation sensing system of this invention as applied to a wheelaxle assembly.

FIG. 1, by way of example, illustrates an embodiment of the invention installed on a vehicle wheel-axle assembly 10 to provide a wheel speed signal. The assembly 10 comprises a nonrotatable axle 11 on which a wheel unit 12 is rotatably supported by bearings 14. Conventional brake mechanism 16 is, as schematically indicated in FIG. 1, suitably mounted on a brake mounting flange 18 fixed to axle 11 and is actuable to brake rotation of wheel unit 12 in a conventional manner. The wheel unit 12 conventionally incorporates a brake drum or disk, as well as suitable mounting means for wheels.

Figure 2:
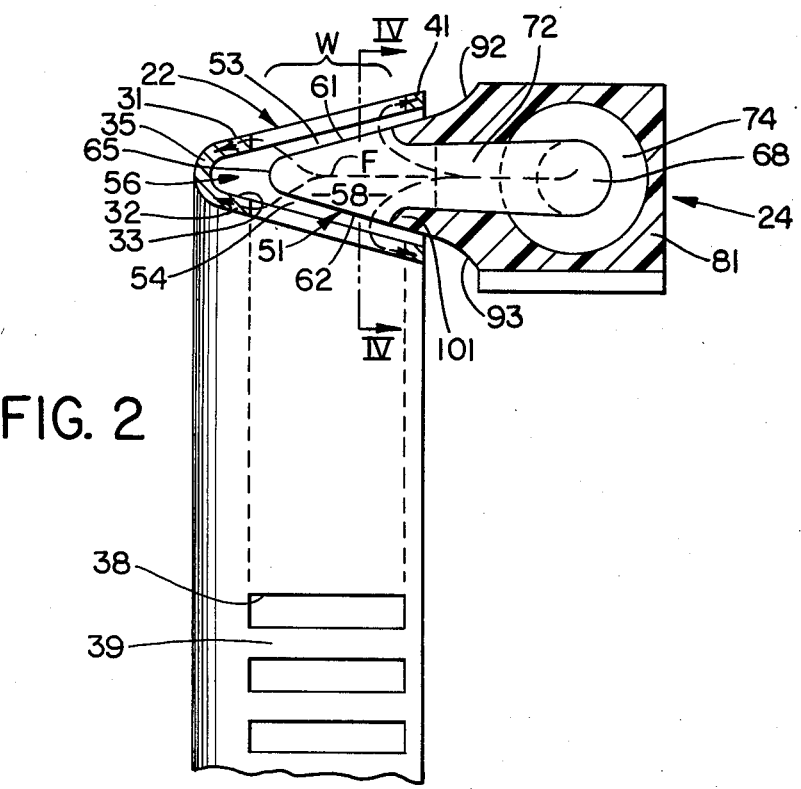
FIG. 2 is an enlarged central sectional view of the rotation sensing system.

The rotation indicating system embodying the invention, generally indicated at 20, comprises a rotor 22 coaxially mounted for rotation with the wheel unit 12 and a sensing device 24 fixed with respect to the axle 11, hereby secured to the flange 18, in sensing opposition to the rotor 22. As wheel unit 12 rotates, rotor 22 rotates relative to sensing device 24 producing a flux change which creates an induced voltage in the sensing device 24 as hereafter discussed. As seen in FIGS. 1 and 2, rotor 22 and the opposed portion of sensing device 24 are complimentary in cross section, one being convexly profiled and the other concavely profiled, the rotor and sensing device being interfitted so as to be spaced by a double or V-shaped air gap, i.e. an air gap with two legs extending transverse to each other.

Turning now more specifically to the structure of the rotor 22, same is formed as a ring of material capable of continuing a magnetic flux path, i.e. a ferromagnetic material, conveniently sheet steel. As seen in radial cross section (FIG. 2), the rotor 22 comprises spaced annular walls 31 and 32 which converge leftwardly away from the sensing device 24 to form a tapered recess 33 opening concavely toward the sensing device 24. The walls 31 and 32, here the radially outer and inner walls respectively, are preferably substantially straight in cross section and are connected at their adjacent leftward ends by a rounded bight portion 35.

The rotor walls 31 and 32 are provided with evenly circumferentially distributed surface interruptions 38 which extend substantially the full width of each wall to maximize the flux changing area of the rotor and hence the output signal of the sensing device 24. While the surface interruptions 38 may take other forms, e.g. teeth, ripples, etc., such interruptions are shown as slots which extend through the thickness of walls 31 and 32 and extend widthwise of such walls. To permit a conveniently high frequency and a desirably uniform substantially sinusoidal wave form for the output signal of the sensing device 24, the slots 38 are preferably of elongate rectangular cross section wherein their dimension axially of the rotor substantially exceeds their dimension circumferentially of the rotor. The slots 38 are preferably evenly spaced apart by webs 39 of the same circumferential width as the slots. The slots 38 terminate short of the free edges of the walls 31 and 32, thereby leaving circumferentially continuously annular rims or edge portions 41.

The rotor 22 may be formed from a blank of thin sheet steel. Due to its ring-shape and substantially V-shape cross section, the rotor will be relatively rigid and free from any tendency to deflect during rotation.

The rotor 22, as seen in FIG. 1, is fixed coaxially to the wheel unit 12. In the example shown, the rightward face of wheel unit 12 is coaxially grooved at 47 to receive the bight portion 35 of the rotor 22 which is secured thereto, as by welding.

In the embodiment shown, the V-shaped recess 33 defined between rotor walls 31 and 32, as seen in cross section, is bisected by a line parallel to the axis of axle 11.

Turning now to sensing device 24 (FIGS. 2 and 3), same includes a sensing portion 51 having a cross sectional shape which compliments that of the rotor 22 and is spaced from the rotor walls 31 and 32 by legs 53 and 54 of an air gap 56. The sensing portion 51 is formed as a tapered protrusion 58 which extends into the recess 33 generally in axial alignment therewith, with its radially outer and inner surfaces 61 and 62 received between and spaced from the opposed inner surfaces of the rotor walls 31 and 32 by the substantially uniform air gap legs 53 and 54, respectively. The leftward end 65 of protrusion 58 is normally spaced from the opposed surface of the bight portion 35 of the rotor by a distance exceeding the average thickness of the air gap legs 53 and 54, and preferably conforms generally in shape to the bight portion 35.

The sensing device 24 comprises a magnet 68 (FIGS. 2 and 3), conveniently a permanent magnet of generally cylindrical form centered on and displaced rightwardly from the protrusion 58. Ferromagnetic pole pieces 71 and 72 extend from the ends (north and south poles) of the magnet 68 in side-by-side relation leftwardly toward and into the rotor recess 33. The leftward ends of pole pieces 71 and 72 form the protrusion 58 aforementioned.

Figure 3:
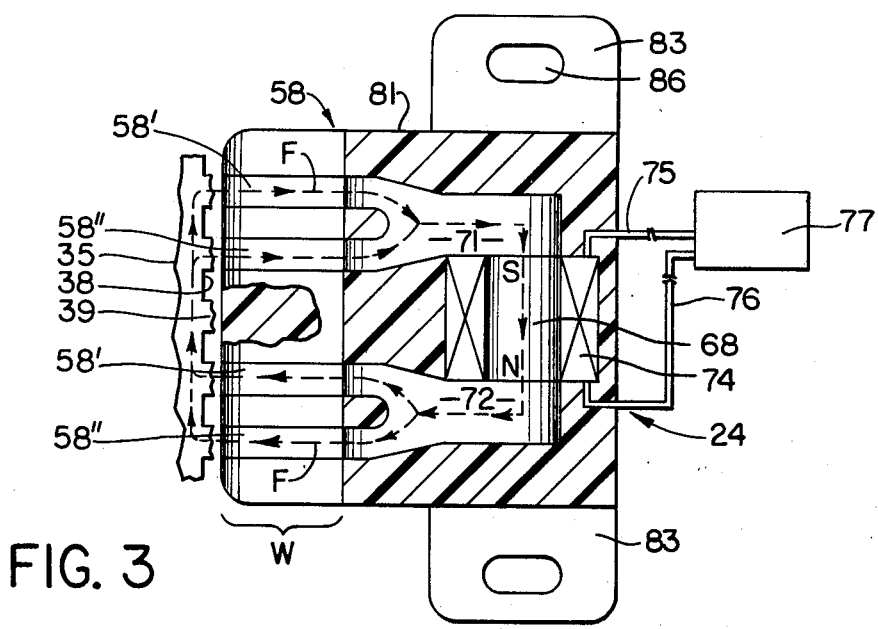
FIG. 3 is a partially broken top view of the sensing device.

A sensing coil 74 is preferably wound around the magnet 68 between pole pieces 71 and 72 for sensing changes in the magnetic flux path afforded by the magnet, pole pieces and rotor, due to rotation of the rotor. As shown in FIG. 3, the coil 74 is connected electrically at 75 and 76 to a suitable load or driven device 77 to apply an electrial signal thereto varying in frequency in accord with the rotative speed of the rotor. The load 77 may for example be the control circuitry of a vehicle antiskid system of known type.

The sensing device 24 further includes a nonmagnetic, electrically insulative housing or encapsulation 81 which serves to interlock and protect the components 71, 72, 74 and 68 therein. The sensing device 24 may be mounted upon the brake mounting flange 18 and, for sake of example, such is accomplished providing housing 81 with integral side flanges 83 having elongated mounting holes 86 to permit movement of the sensing device toward and away from the rotor. A bracket 87 (FIG. 1) secured by screws 88 to the brake mounting flange 18 may be used to support the sensing device 24, with further screws 91 extending through holes 86 for securing the sensing device 24 in desired axial position with respect to the rotor 22.

The housing 81, which may be of conventional synthetic resin material, everywhere surrounds elements 68, 71, 72 and 74, preferably even including a protective skin of such material over the surfaces 61 and 62 of pole pieces 71 and 72. On the other hand, the surfaces 61 and 62 of pole pieces 71 and 72 (i.e. the protrusion 58) may be left uncovered as in FIG. 2. As seen in FIG. 2, housing 81 extends rightwardly from protrusion 58 initially along the slope or taper line of their surfaces 61 and 62 and then diverges, as seen at 92 and 93, to form shoulders which upon rightward deflection of the rotor would contact the rotor edge portions 41 and 42, respectively, prior to bottoming of the protrusion 58 within the rotor recess 33. The housing 81 thus assists in preserving the pole pieces and rotor from self-destructive contact. It will be noted that the cross-sectional thickness of the pole pieces is a maximum at the rightward part (FIG. 2) of protrusion 58, with the cross-sectional thickness of the pole pieces 71 and 72 being reduced, as shown at fillets 101, where the material of the housing begins to enclose the top and bottom walls of the pole pieces.

Figure 4:
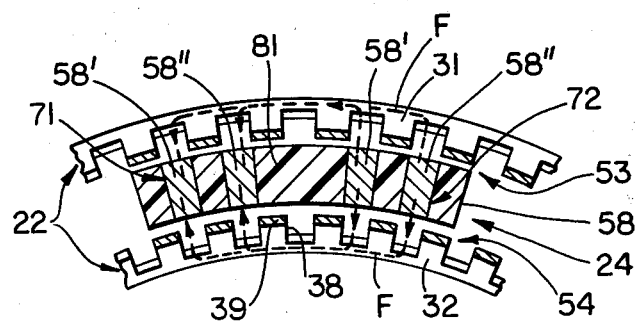
FIG. 4 is a fragmentary sectional view taken on line IV—IV of FIG. 2.

As seen in FIGS. 3 and 4, the protruding leftward ends of pole pieces 71 and 72 correspond in width and circumferential spacing to the width and circumferential spacing of the rotor slots 38. Whereas it is contemplated that each pole piece 71 and 72 may terminate in a single protruding part 58', for greater apparatus sensitivity, it is preferred that the pole pieces 71 and 72 be bifurcated (FIG. 3) so as to each provide a pair of protruding parts 58' and 58''. These parts 58' and 58'' are separated by a spacing corresponding to the circumferential width of web 39, and adjacent protruding parts 58'' and 58' of adjacent pole pieces 71 and 72 are separated from each other by a spacing corresponding to a multiple of the circumferential spacing of adjacent web 39.

OPERATION

In operation, the rotor 22 rotates with the wheel unit 12 and thereby moves its alternating slots 38 and webs 39 circumferentially past the protruding parts 58', 58'' of the pole pieces 71 and 72 of sensing device 24. With magnet 68 oriented as shown in FIG. 3, the path of magnetic flux therefrom can be traced along the broken line F in FIGS. 2–4. Thus, the magnetic flux F is shown to proceed from the north pole N of magnet 68 into pole piece 72 (FIGS. 3 and 4), thereafter splitting to enter parts 58' and 58'' of pole piece 72. The flux passes from both the radially outer and inner surfaces 61 and 62 throughout the exposed, tapering length W thereof, and across the air gap legs 53 and 54 and thus into the rotor webs 39. The flux is transferred along the webs 39 to the circumferentially continuous bight and rim portions 35 and 41, so as to pass circumferentially along the rotor to the webs 39 nearest the protruding parts 58' and 58'' of the remaining pole piece 71. In a manner oppositely ordered, but otherwise similar to the above-described flux transfer, the flux is transferred from the rotor to the pole piece 71 and thence to the south pole S of magnet 68 to complete the flux loop. The magnitude of flux transferred is maximized with the rotor webs 39 directly opposed to the protruding parts 58', 58'', and is minimized when the rotor slots 38 are directly opposed to such parts 58', 58''. These conditions alternate during rotor rotation, inducing a corresponding alternating signal at the output 75, 76 of coil 74, having a frequency corresponding to the rotational speed of the rotor 22.

The sensing device 24 is insensitive to radial motion of the rotor, as due to vibration or eccentricity thereof. This is because the sensing protrusion 58 faces radially outer and inner parts of the rotor, rather than across a single gap. Thus, should the rotor shift downward to widen the air gap leg 54, it simultaneously and compensatingly narrows the outer gap leg 53. Accordingly, the reduction in flux travel across the widened gap 54 is compensated for by the increased magnetic flux travel across the narrowed gap 53. Accordingly, a double or two-legged gap cancels the effect of radial motion of the rotor 22 with respect to the sensing device 24, insofar as the output signal of the sensing device is concerned.

Moreover, the sensing device 24 is also relatively insensitive to axial motion of the rotor. More particularly, the elongate (here 1 to 4) taper means that for a given amount of axial shifting of the rotor with respect to the sensing device, the average thickness of the air gap leg 53 and 54 will change by only a fraction of that amount (here one quarter of that amount). Further, the slotted width of rotor 22 (extending generally axially of the rotor) exceed the width W of the exposed or active portion of the protruding parts 58', 58'' such that the full width W of the parts 58', 58'' will still oppose the slotted portion of the rotor despite substantial rightward or leftward motion of the rotor from its position shown in FIG. 2.

As compared to prior devices in which the rotor and sensing device have flat radial faces opposed axially across a gap, this inventive device can be provided with greater axial clearance between the sensing device and rotor to substantially reduce the danger of collision therebetween and consequent damage thereto. Further, in the inventive devices, the substantial area of the surfaces of the rotor 22 and sensing protrusion 58 permits the average working thickness T of the air gap legs 53 and 54 to be relatively large, without loss in sensitivity as compared to conventional radially faced rotors and sensing devices of similar radial cross sectional area.

It is also contemplated that the free end 65 of the sensing projection may be leftwardly extended, to a smaller radius than the rightward face of rotor bight 35 to provide blocking engagement between the free end 65 and the interior surface of bight 35 while the average thickness of the air gaps 53 and 54 remains greater than zero.

Figure 5:
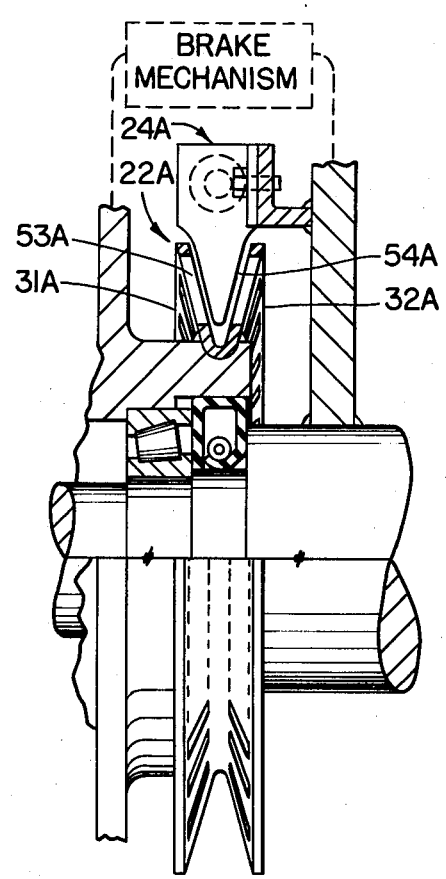
FIG. 5 is a view similar to FIG. 1 showing a modification.

Although in the above-discussed FIGS. 1–4 embodiment, the rotor 22 is arranged to axially face the sensing device 24, other orientations are contemplated. For example, FIG. 5 shows a rotor 22A with its walls 31A and 32A diverging radially, rather than axially, and radially opposed by sensing device 24A. Thus, sensing device 24A is insensitive to axial rotor motion, since widening of one air gap leg 53A or 54A is compensated by narrowing of the other. Sensing device 24A is also substantially insensitive to radial motion of rotor 22A, in view of its elongate taper wherein a given change in radial spacing of rotor and sensing device results in a substantially smaller change in air gap width.

Although the normally preferred embodiment of the invention here shown includes a concave rotor and convex sensing device, also contemplated, within the broader aspects of the invention, is the reverse configuration (convex rotor, concave sensing device).

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a rotation indication system for generating signals in response to the rotation of a body, said indication system including an annular rotor mounted for rotation, said rotor having a plurality of surface interruptions circumferentially arranged thereon, and sensing means mounted near said rotor but fixed against rotation with said rotor, said sensing means including a sensing portion opposable across an air gap to said surface interruptions and an output portion responsive to rotation of said surface interruptions past said sensing portion for producing an electrical output signal representing the rotation of said rotor, comprising the improvement wherein said rotor and said sensing portion have complimentary substantially V-shaped cross sections in an axial plane of said rotor, the convex one of said V-shaped cross sections extending into and being spaced from the concave one of said V-shaped cross sections to define said air gap therebetween, said air gap being of correspondingly V-shaped cross section having two converging legs, the rotor having convergent V-defining surfaces which face corresponding ones of convergent V-defining surfaces on said sensing portion across corresponding legs of said V-shaped air gap.

2. The system of claim 1 in which said rotor has a recess facing said sensing means and defining said concave one of said V-shaped cross sections, said sensing means having a protrusion facing and extending into said rotor recess and defining said convex one of said V-shaped cross sections.

3. The system of claim 1 in which said convergent V-defining surfaces of said rotor and said sensing portion converge substantially axially of said rotor.

4. The system of claim 1 in which, in a radial plane of said rotor, said convergent V-defining surfaces of said rotor and sensing portion are linear over the majority of their length, and the linear elements of the V-defining surfaces of said rotor are substantially parallel to the adjacent linear elements of the V-defining surfaces of said sensing portion, wherein each said air gap leg is of substantially uniform width in said radial plane over the majority of its length.

5. The system of claim 4 in which said V-shaped cross sections each converge to a blunt end.

6. The system of claim 1 in which said sensing means includes a source of magnetic flux, said sensing portion comprising pole pieces extending from said magnetic flux source toward said rotor and facing said surface interruptions across said legs of said air gap such that movement of said surface interruptions past said pole pieces induces changes in said magnetic flux, said output portion of said sensing means comprising a coil responsive to a change in said magnetic flux for producing said output signal.

7. The system of claim 2 in which said surface interruptions are provided in both of said opposed walls defining said recess and opposite the convergent faces of said sensing protrusion, wherein, as seen in the radial plane of the rotor, the lengths of said V-shaped recess and sensing protrusion substantially exceed the widths thereof, such that a change in location between said rotor and said sensing protrusion in said radial plane and lengthwise of their V-shapes, results in a substantially smaller change in the thickness of said air gap.

8. The system of claim 2 in which said recess opens axially of said rotor, said sensing means being offset axially from said rotor with said sensing protrusion extending axially into said recess.

9. The system of claim 2 in which said recess and sensing protrusion have about one-in-four tapers.

10. The system of claim 2 in which said sensing means includes a permanent magnet spaced from said recess and a pair of pole pieces of magnetizable material extending from opposite poles of said permanent magnet toward said recess, said sensing protrusion constituting the free ends of said pole pieces, said output means comprising a coil arranged cooperatively with the magnetic flux path through said magnet.

11. The system of claim 10 in which said sensing means includes an insulative surround extending back from said sensing protrusion toward said magnet, said insulative surround flaring into a broadened taper as it extends away from said sensing protrusion, said recess being longer, in said axial plane of said rotor, than said sensing protrusion such that interference between said flared portion of said insulative surround and the free edges of said recess prevents direct contact between the opposed faces of said sensing protrusion and said recess walls.

12. The system of claim 10 in which each pole piece is split circumferentially of said rotor to provide a pair of protruding parts separated circumferentially of said rotor by a notch, the centerline spacing of said protruding parts and notches corresponding to the centerline spacing of said surface interruptions.

13. The system of claim 10 in which said surface interruptions are slots, said rotor being of magnetizable sheet material bent in cross section to a V-shape and with said slots extending through the thickness of said sheet material, the slots extending axially of said rotor, the slots in the radially inner leg of said rotor V-shaped cross section being radially aligned with corresponding slots in the radially outer leg of said rotor V-shaped cross section.

14. The system of claim 13 in which the axial length of said rotor slots exceeds the axial length of said sensing protrusion.

15. The system of claim 1 in which said convergent V-defining surfaces of said rotor and said sensing device converge substantially radially of said rotor.

16. A rotation indication system for generating signals in response to the rotation of a body, said indication system comprising:
an annular rotor fixed to said body for rotation therewith about an axis, said rotor having an annular recess concentric with said axis and defined by opposed walls connected by a bight portion, said opposed walls and bight portion being annular, said opposed walls each having a plurality of surface interruptions spaced circumferentially therealong;
sensing means mounted near said rotor but fixed against rotation therewith, said sensing means including a sensing protrusion projecting into and loosely received within said recess, said protrusion having a cross sectional shape corresponding substantially to that of said recess, said sensing protrusion being normally spaced between said opposed walls of said recess by an air gap of corresponding cross sectional shape, said sensing means including output means responsive to rotation of said surface interruptions past said sensing protrusion for producing an electrical signal representing said rotation.

* * * * *